United States Patent
Kumar et al.

(10) Patent No.: US 8,117,262 B2
(45) Date of Patent: Feb. 14, 2012

(54) METHODS AND APPARATUSES FOR LOCATING AN APPLICATION DURING A COLLABORATION SESSION

(75) Inventors: Manish Kumar, Sunnyvale, CA (US); Weidong Chen, Palo Alto, CA (US); Lei Zhu, San Jose, CA (US); Min Zhu, Los Altos Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 457 days.

(21) Appl. No.: 11/754,151

(22) Filed: May 25, 2007

(65) Prior Publication Data

US 2007/0294350 A1    Dec. 20, 2007

Related U.S. Application Data

(63) Continuation-in-part of application No. 11/323,431, filed on Dec. 29, 2005, which is a continuation-in-part of application No. 11/172,089, filed on Jun. 29, 2005, now Pat. No. 8,046,410.

(51) Int. Cl.
*G06F 15/16* (2006.01)
(52) U.S. Cl. .................... 709/205; 709/224; 709/227
(58) Field of Classification Search .......... 709/223–224, 709/203–205, 227–228
See application file for complete search history.

(56) References Cited

U.S. PATENT DOCUMENTS

| | | | |
|---|---|---|---|
| 7,543,237 B2 * | 6/2009 | Kontny et al. | 715/759 |
| 7,590,941 B2 * | 9/2009 | Wee et al. | 715/753 |
| 2002/0078150 A1 | 6/2002 | Thompson et al. | |
| 2003/0028595 A1 | 2/2003 | Vogt et al. | |
| 2003/0158945 A1 * | 8/2003 | Liu | 709/227 |
| 2003/0216981 A1 | 11/2003 | Tillman | |
| 2004/0064431 A1 | 4/2004 | Dorner et al. | |
| 2005/0071506 A1 | 3/2005 | Hettish | |
| 2005/0097169 A1 * | 5/2005 | Mukherjee et al. | 709/204 |
| 2006/0161620 A1 * | 7/2006 | Ganesan et al. | 709/204 |
| 2006/0195520 A1 * | 8/2006 | Stevens et al. | 709/204 |
| 2008/0072158 A1 * | 3/2008 | Samele et al. | 715/751 |
| 2008/0133736 A1 * | 6/2008 | Wensley et al. | 709/224 |

OTHER PUBLICATIONS

"Notification of Transmittal of the International Search Report and the Written Opinion of the International Searching Authority, or the Declaration," International Filing Date: Dec. 29, 2006, International Application No. PCT/US2006/062745, Applicant: Webex Communications, Inc., Date of Mailing: Jul. 17, 2008, pp. 1-15.
Supplementary European Search Report, European Patent Office, European Patent Application No. 06848896.4 corresponding to PCT/US2006/062745 dated Apr. 13, 2011, 7 pages.

\* cited by examiner

*Primary Examiner* — Bharat Barot

(57) ABSTRACT

In one embodiment, the methods and apparatuses include requesting an expert during a collaboration session; determining a subject matter of the collaboration session; detecting a potential participant to serve as the expert; and inviting the potential participant to join the collaboration session.

19 Claims, 9 Drawing Sheets

METHODS AND APPARATUSES FOR LOCATING AN APPLICATION DURING A COLLABORATION SESSION

RELATED APPLICATION

The present invention is continuation-in-part of U.S. patent application Ser. No. 11/323,431, filed on Dec. 29, 2005 entitled "Methods and Apparatuses For Locating an Expert During a Collaboration Session" which is incorporated herein by reference. U.S. patent application Ser. No. 11/323,431 is continuation-in-part of U.S. patent application Ser. No. 11/172,089, filed on Jun. 29, 2005 now U.S. Pat. No. 8,046,410 entitled "Methods and Apparatuses For Extending a Dynamic Social Network System."

FIELD OF INVENTION

The present invention relates generally to locating an expert and, more particularly, to locating an expert during a collaboration session.

BACKGROUND

There has been an increased use in collaboration sessions that are Internet or web-based to communicate with employees, vendors, and clients. During these collaboration sessions, information is typically exchanged between multiple participants. This exchanged information may include audio, graphical, and/or textual information.

There has also been an increased use of social networks such as Friendster, LinkedIn, and Spooke to facilitate connections between the respective community members.

SUMMARY

In one embodiment, the methods and apparatuses include requesting an expert during a collaboration session; determining a subject matter of the collaboration session; detecting a potential participant to serve as the expert; and inviting the potential participant to join the collaboration session.

BRIEF DESCRIPTION OF THE DRAWINGS

The accompanying drawings, which are incorporated in and constitute a part of this specification, illustrate and explain one embodiment of the methods and apparatuses for locating an application during a collaboration session. In the drawings.

DETAILED DESCRIPTION

The following detailed description of the methods and apparatuses for locating an application during a collaboration session refers to the accompanying drawings. The detailed description is not intended to limit the methods and apparatuses for locating an application during a collaboration session. Instead, the scope of the methods and apparatuses for locating an application during a collaboration session is defined by the appended claims and equivalents. Those skilled in the art will recognize that many other implementations are possible, consistent with the present invention.

References to a device include a device utilized by a user such as a desktop computer, a portable computer, a personal digital assistant, a video phone, a landline telephone, a cellular telephone, and a device capable of receiving/transmitting an electronic signal.

References to a collaboration session include a plurality of devices that are configured to view content submitted by one of the devices. For example, the collaboration session may include a data conference or a video conference through a network, a phone line, and/or the Internet. Further, the communications between participants may be through text messaging, audio conferencing, video conferencing, email, short messaging service, and the like.

References to a participant include a user of a device that participates or is scheduled to participate in the collaboration session.

References to a presenter include a participant that shares content shared with other participants.

References to an attendee include a participant that receives content shared by another participant. The attendees are capable of viewing content that is offered by the presenter. In some instances, the attendee is capable of modifying the content shared by the presenter.

Figure 1:
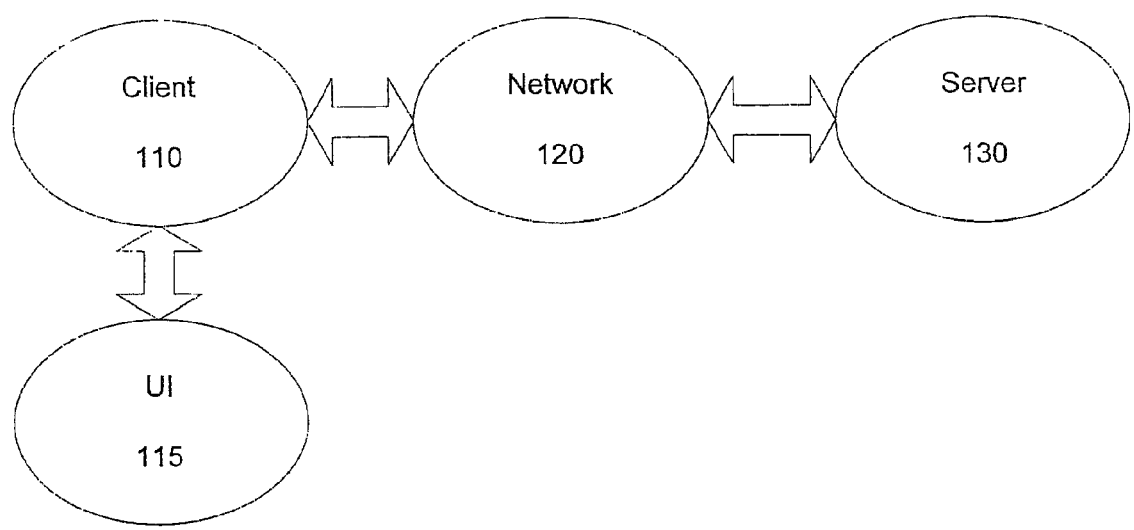
FIG. 1 is a diagram illustrating an environment within which the methods and apparatuses for locating an application during a collaboration session are implemented.

FIG. 1 is a diagram illustrating an environment within which the methods and apparatuses for locating an application during a collaboration session are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., a keypad, a video display screen, input and output interfaces, etc., in the same housing such as a personal digital assistant). In other embodiments, one or more user interface 115 components (e.g., a keyboard, a pointing device such as a mouse, a trackball, a microphone, a speaker, a display, a camera, etc.) are physically separate from, and are conventionally coupled to, the electronic device 110. In one embodiment, the user utilizes interface 115 to access and control content and applications stored in electronic device 110, server 130, or a remote storage device (not shown) coupled via network 120.

In accordance with the invention, embodiments of locating an expert during a collaboration session below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
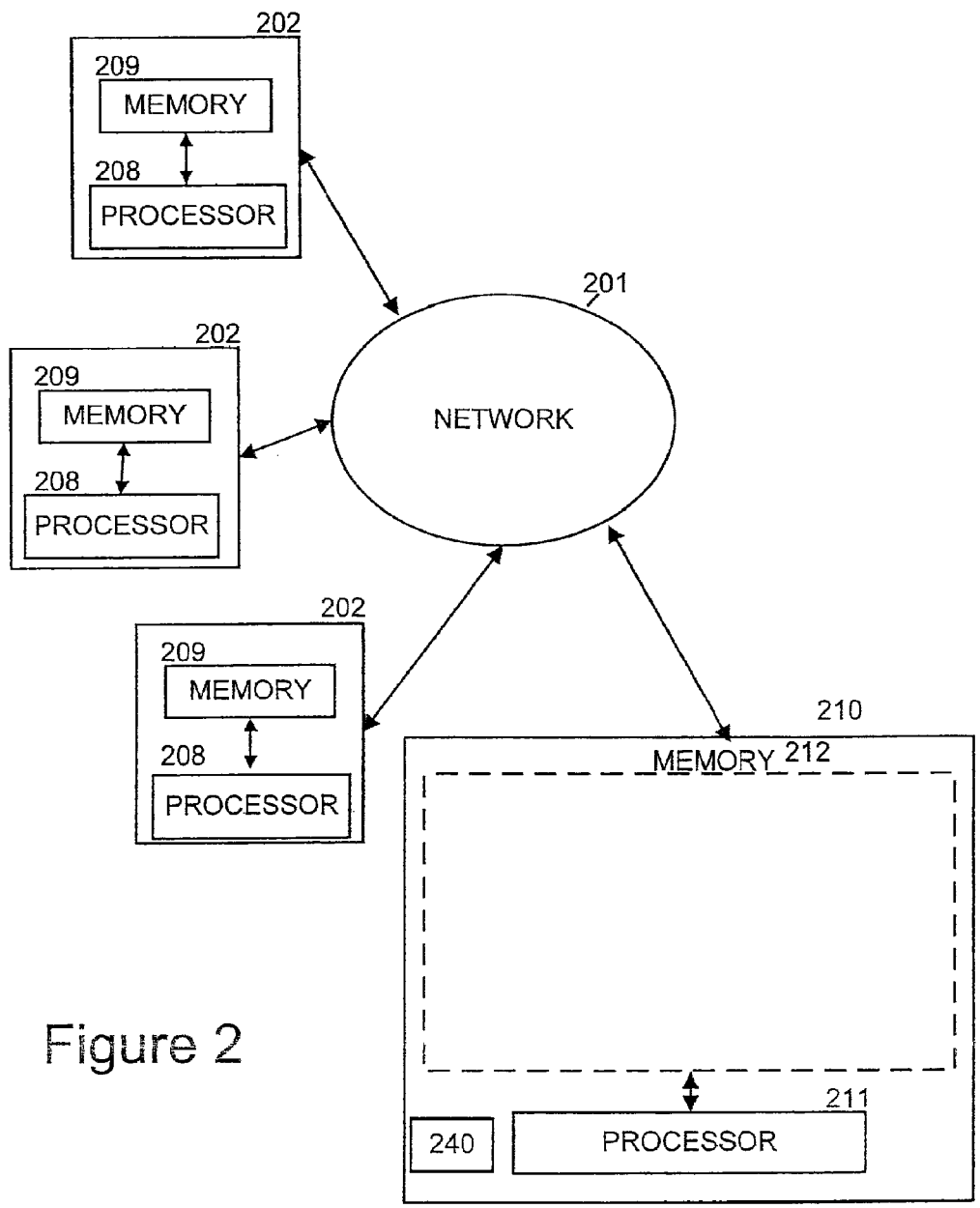
FIG. 2 is a simplified block diagram illustrating one embodiment in which the methods and apparatuses for locating an application during a collaboration session are implemented.

FIG. 2 is a simplified diagram illustrating an exemplary architecture in which the methods and apparatuses for locating an application during a collaboration session are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for extending a dynamic social network system. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on locating an expert during a collaboration session as determined using embodiments described below.

In one embodiment, the network system utilizes the collaboration sessions to share information and communicate among the participants. For example, collaboration sessions are configured to provide real-time communication between multiple participants. In one embodiment, the content that is shared among the participants of the collaboration session is content that is displayed on the desktop of one of the participants.

Figure 3:
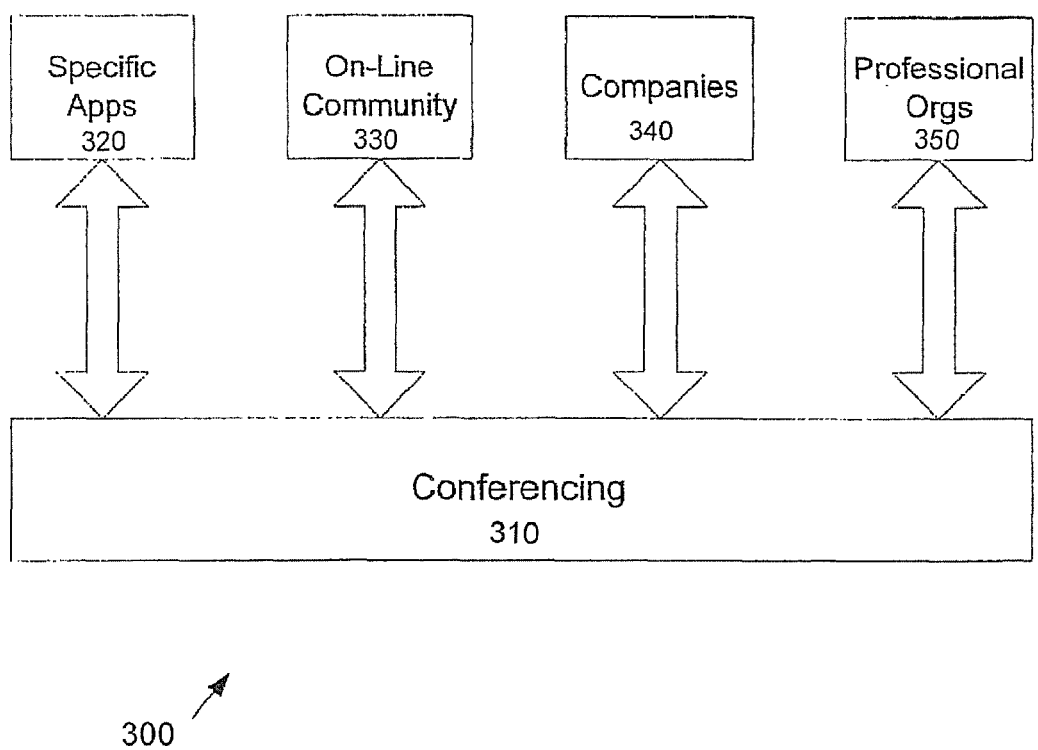
FIG. 3 is a simplified block diagram illustrating a system, consistent with one embodiment of the methods and apparatuses for locating an application during a collaboration session.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a conferencing module 310, an applications grouping 320, an on-line community grouping 330, a company grouping 340, and a professional organization grouping 350.

In one embodiment, the conferencing module 310 communicates with the applications grouping 320, the on-line community grouping 330, the company grouping 340, and the professional organization grouping 350. In one embodiment, the conferencing module 310 coordinates tasks, requests, and communications between and within the applications grouping 320, the on-line community grouping 330, the company grouping 340, and the professional organization grouping 350.

In one embodiment, the conferencing module 310 allows the different groupings to communicate and hold collaboration sessions between users within each grouping and across multiple groupings.

In one embodiment, the conferencing module 310 detects content that is utilized by one of the users within one of the groupings. In one embodiment, the content is utilized in connection with multiple devices within a collaboration session between multiple parties. For example, the collaboration session may include a data conference or a video conference through a network, a phone line, and/or the Internet.

In one embodiment, the content is a document utilized within a collaboration session. In another embodiment, the content is audio visual media that is utilized within a collaboration session.

In one embodiment, the conferencing module 310 monitors input from various interface devices connected to devices that are participating in the collaboration session. These various interface devices include a keyboard, a pointing device, a microphone, a telephone, a video camera, and the like.

In one embodiment, the applications grouping 320 includes users that are related to a particular application. For example, multiple users that are interested in a particular application can form a user's group that is represented by the applications grouping 320.

In one embodiment, the on-line community grouping 330 includes users that are related to a particular community group such as Friendster or another social networking group.

In one embodiment, the company grouping 340 includes users that are related to a particular company. For example, multiple users that are employees at a particular company are related to each other and are represented by the company grouping 340.

In one embodiment, the professional organization grouping 350 includes users that are related to a particular professional organization. For example, multiple users that are members of a particular professional organization are related to each other and are represented by the professional organization grouping 350.

The system 300 in FIG. 3 is shown for exemplary purposes and is merely one embodiment of the methods and apparatuses for locating an application during a collaboration session. Additional modules may be added to the system 300 without departing from the scope of the methods and apparatuses for extending a dynamic social network system. Similarly, modules may be combined or deleted without departing from the scope of the methods and apparatuses for locating an application during a collaboration session.

Figure 4:
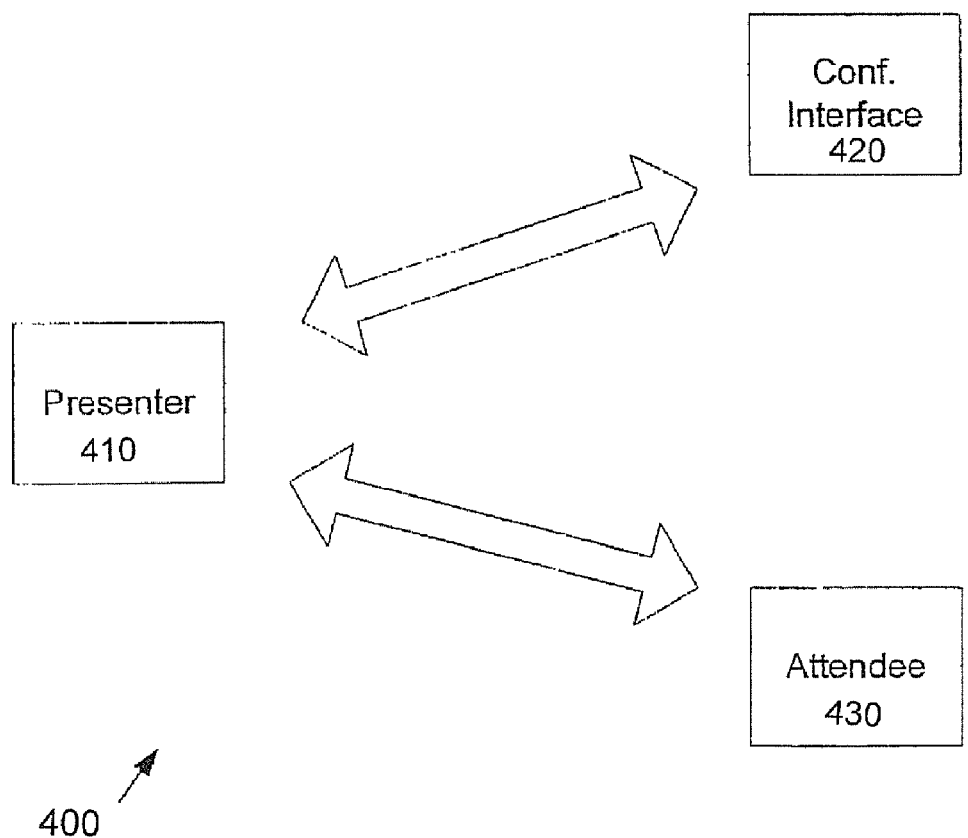
FIG. 4 is a simplified block diagram illustrating a system, consistent with one embodiment of the methods and apparatuses for locating an application during a collaboration session.

FIG. 4 illustrates one embodiment of a system 400. In one embodiment, the system 400 facilitates a collaboration session between multiple parties. In one embodiment, the system 400 includes a presenter device 410, a conference interface 420, and an attendee device 430. In one embodiment, the presenter device 410 and the attendee device 430 are utilized by a presenter user and an attendee user, respectively.

In one embodiment, the presenter device 410 shares content with the attendee device 430. In one embodiment, the attendee device 430 also shares content with the presenter device 410. The conference interface 420 monitors the communications between the presenter device 410 and the attendee device 430.

Figure 5:
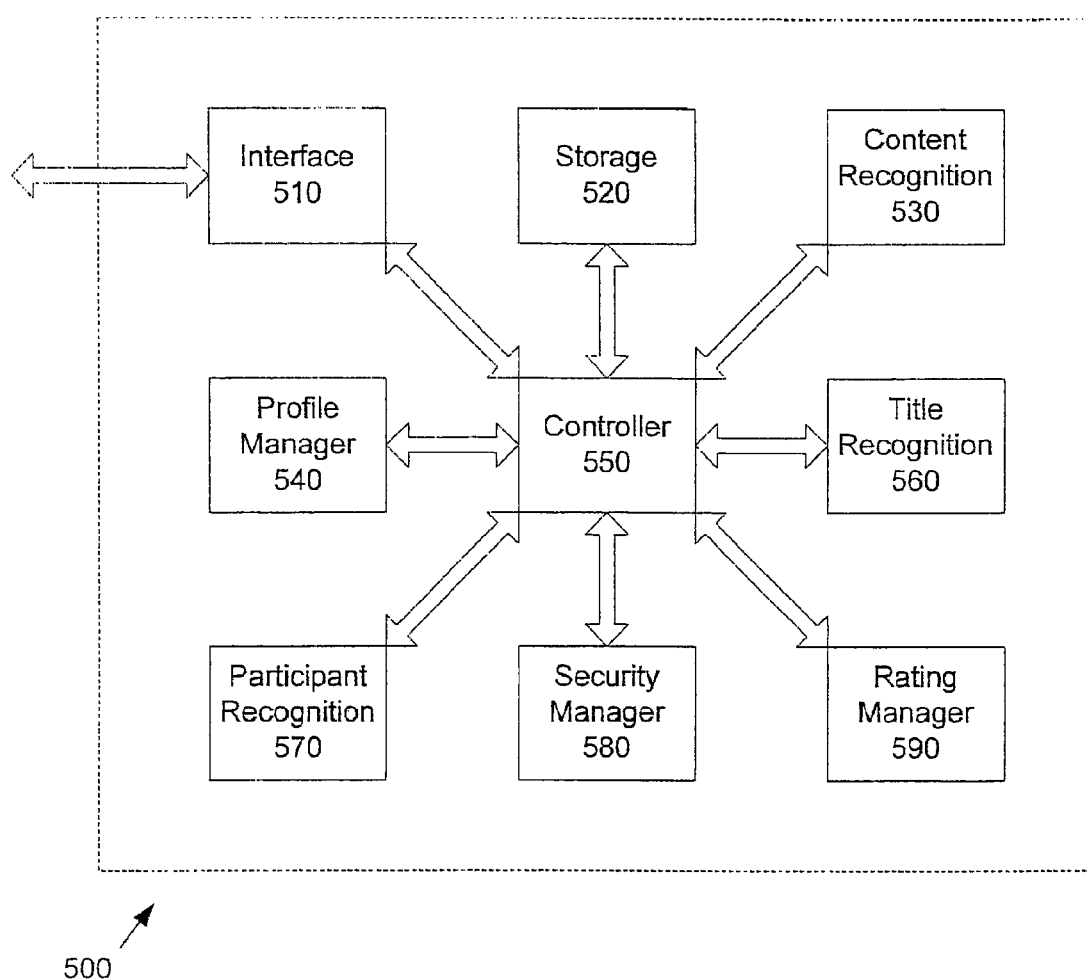
FIG. 5 is a simplified block diagram illustrating a system, consistent with one embodiment of the methods and apparatuses for locating an application during a collaboration session.

FIG. 5 illustrates one embodiment of a system 500. In one embodiment, the system 500 is embodied within the server 130. In another embodiment, the system 500 is embodied within the electronic device 110. In yet another embodiment, the system 500 is embodied within both the electronic device 110 and the server 130.

In one embodiment, the system 500 includes an interface module 510, a storage module 520, a content recognition module 530, a profile manager module 540, a control module 550, a title recognition module 560, an attendee recognition module 570, a security manager module 580, and a rating manager 580.

In one embodiment, the control module 550 communicates with the interface module 510, the storage module 520, the content recognition module 530, the profile manager module 540, the title recognition module 560, the attendee recognition module 570, the security manager module 580, and the rating manager 580. In one embodiment, the control module 350 coordinates tasks, requests, and communications between the interface module 510, the storage module 520, the content recognition module 530, the profile manager module 540, the title recognition module 560, the attendee recognition module 570, the security manager module 580, and the rating manager 580.

In one embodiment, the interface module 510 receives a signal from one of the electronic devices 110. In one embodiment, the electronic devices 110 are participating in a collaboration session. For example, the system 500 monitors the collaboration session between the presenter device 410 and the attendee device 430. In another embodiment, the interface module 510 delivers a signal to one of the electronic devices 110.

In one embodiment, the interface module 510 monitors input from various interface devices connected to devices that are participating in the collaboration session. These various interface devices include a keyboard, a pointing device, a microphone, a telephone, a video camera, and the like. Further, the interface module 510 also monitors the identity of the participants of a collaboration session, the title of the collaboration session, and the content exchanged in the collaboration session.

In one embodiment, the storage module 520 stores a record including a list of attributes associated with the each device participating in a collaboration session. An exemplary list of attributes is shown in a record 600 within FIG. 6.

In another embodiment, the storage module 520 stores the collaboration session. In one embodiment, the storage module 520 stores the content that is presented during the collaboration session. In another embodiment, the storage module 520 stores the annotations and comments produced by the participants of the collaboration session.

In another embodiment, the storage module 520 stores scoring produced by the rating manager 590. In one embodiment, the scoring values for each user are stored.

In one embodiment, some of the users are subject matter experts that have expertise in a subject area.

In another embodiment, the storage module 520 stores applications associated with different users. For example, different users have access to various applications that are associated with each user.

In one embodiment, the content recognition module 530 detects content that is utilized by the user in connection with the device. In one embodiment, the content is utilized in connection with multiple devices within a collaboration session between multiple parties. For example, the collaboration session may include a data conference or a video conference through a network, a phone line, and/or the Internet.

In one embodiment, the content is a document utilized within a collaboration session. In another embodiment, the content is audio visual media that is utilized within a collaboration session.

In one embodiment, the content recognition module 530 detects the content exchanged between the presenter device 410 and the attendee device 430. In one embodiment, the content is textual. In another embodiment, the content is audio. In another embodiment, the content is graphical.

In one embodiment, the content recognition module 530 analyzes this content to identify keywords. In one embodiment, the keywords can be identified by the frequency in which the words are utilized. In another embodiment, the keywords are identified by the context of the related words. For example, if the content being exchanged between the presenter device 410 and the attendee device 430 relate to computers, then the frequent use of terms such as memory, RAM, and chips may have increased significance during the collaboration session.

In one embodiment, the profile manager module 540 organizes a plurality of profiles. In one embodiment, each profile corresponds to each individual user. In another embodiment, each individual user may have multiple profiles.

In one embodiment, a profile describes attributes of the associated user. For example, the profile may include areas of interest of the associated user. Further, the profile may also describe the areas of expertise corresponding to the associated user.

In another embodiment, the profile may also describe the relational hierarchy between multiple users. For example, the profile may also describe the title and level of the user within a company or organization.

In one embodiment, the title recognition module 560 detects the titles that describe or label collaboration sessions. In one embodiment, collaboration sessions have corresponding titles or descriptions that describe the purpose or content of the collaboration sessions. For example, a particular collaboration session may have a title "Mail Server Maintenance". The title of this particular collaboration session may be stored within a calendaring system that helps participants of this particular collaboration session keep track of their respective schedules.

In one embodiment, the participant recognition module 570 detects the identities of the participants of the collaboration session. In one embodiment, collaboration sessions have schedule participants that are scheduled to participate in a particular collaboration session. Further, there may be additional or fewer actual participants that join the particular collaboration session. In one embodiment, the participant recognition module 570 detects both scheduled and actual participants for a particular collaboration session.

In one embodiment, the participant recognition module 570 detects the identities of the participants of the collaboration session. In one embodiment, collaboration sessions have schedule participants that are scheduled to participate in a particular collaboration session. Further, there may be additional or fewer actual participants that join the particular collaboration session.

In one embodiment, the participant recognition module 570 detects distinct participants through their respective associated profiles.

In one embodiment, the security manager module 580 controls access to the profiles of each user based on the information of a requesting party. For example, if the requesting party is authorized to gain access to other profiles, the requesting party can search for profiles that match a particular criteria such as subject expertise, experience, and the like.

In another embodiment, the security manager module 580 controls access to the applications associated the profiles of each user. In one embodiment, access to these applications are based on the information of a requesting party and the corresponding licensing restrictions associated with each individual application. For example, an application may restrict the number of users that are simultaneously viewing the application. In another example, an application may restrict a different user other than the licensed/registered user from utilizing the application.

In one embodiment, the rating manager module 590 ranks and rates the available profiles based on a match between a request and the profile information. For example, a user may request a search for other users with an expertise in a particular area of specialty. The rating manager module 590 may review the profiles of other users and select and rank the corresponding profiles based on the whether the profiles match the area of specialty requested by the user.

In another embodiment, the rating manager module 590 ranks and rates the available applications based on a match between a request and the profile information. For example, a user may request a search for other users with an expertise in a particular area of specialty. The rating manager module 590 may review the profiles of other users and select and rank the applications associated with these profiles based on the whether the profiles match the area of specialty requested by the user. In another example, a user may request a search for applications with an expertise in a particular area of specialty. The rating manager module 590 may review the available applications associated with other users and select and rank the applications associated with these profiles based on the whether the profiles match the area of specialty requested by the user.

In one embodiment, the system 500 suggests additional participants for a particular collaboration session based on the invited participants. In another embodiment, the system 500 suggests additional participants for a particular collaboration session based on the title or topic of the particular collaboration session.

In one embodiment, the system 500 suggests additional applications for a particular collaboration session based on the invited participants. In another embodiment, the system 500 suggests additional applications for a particular collaboration session based on the title or topic of the particular collaboration session.

The system 500 in FIG. 5 is shown for exemplary purposes and is merely one embodiment of the methods and apparatuses for locating an application during a collaboration session. Additional modules may be added to the system 300 without departing from the scope of the methods and apparatuses for locating an application during a collaboration session. Similarly, modules may be combined or deleted without departing from the scope of the methods and apparatuses for locating an application during a collaboration session.

Figure 6:
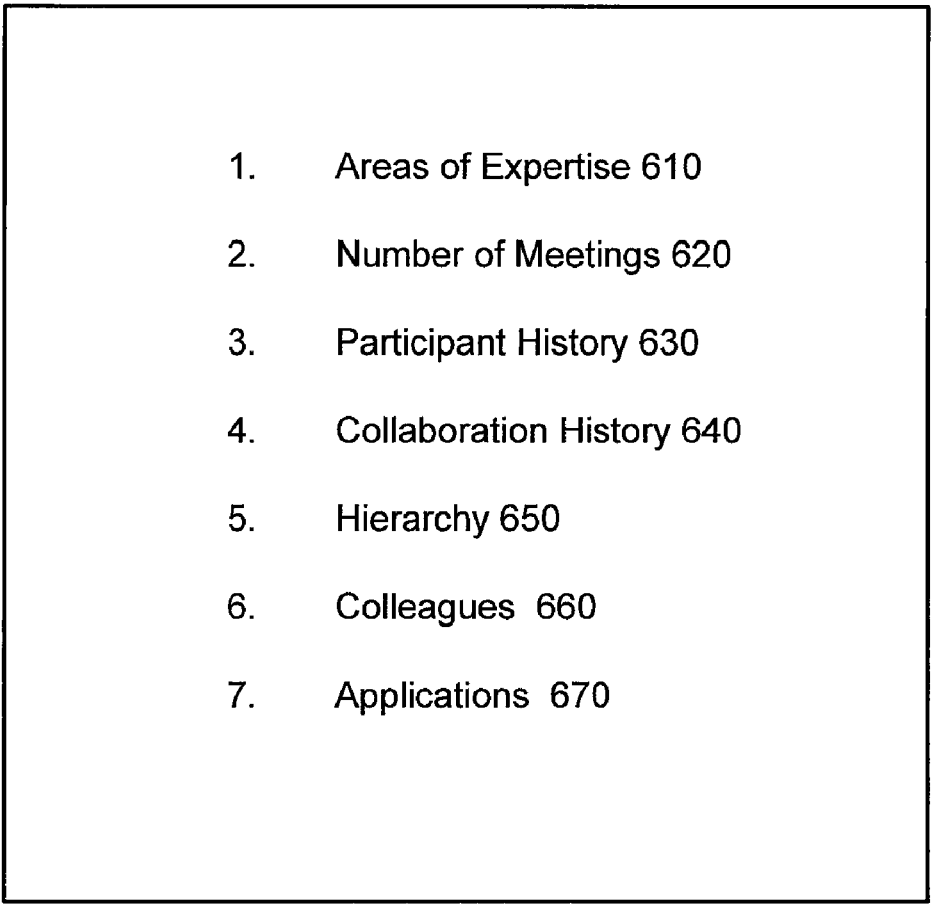
FIG. 6 is an exemplary record for use with the methods and apparatuses for locating an application during a collaboration session.

FIG. 6 illustrates an exemplary record 600 for use with the methods and apparatuses for locating an application during a collaboration session. In one embodiment, the record 600 illustrates an exemplary record associated with a profile corresponding to a user. In one embodiment, the profile associated with the user is initiated based on the participation of the user during a collaboration session. Further, the profile associated with the user is updated and refined based on the participation of the user during a collaboration session.

In one embodiment, there are multiple records such that each record 600 is associated with a particular profile corresponding to a particular user. In another embodiment, multiple profiles are associated with the same user and each profile is represented by a record 600.

In one embodiment, the record 600 includes an areas of expertise field 610, a collaboration frequency field 620, a participant history field 630, a collaboration history field 640, a hierarchy field 650, a colleagues field 660, and an application field 670. In one embodiment, the record 600 resides within the storage module 520. In one embodiment, the record 600 describes an attributes detected through the system 500.

In one embodiment, the areas of expertise field 610 includes information related to the expertise of the user corresponding to the record 600. For example, the user may have expertise designing websites, programming databases, building houses, and the like. In one embodiment, the areas of expertise for a user are determined through the content exchanged during the collaboration sessions and through titles of collaboration sessions participated in by the user.

In one embodiment, the collaboration frequency field 620 includes information related the frequency in which the user associated with the record 600 participates in a collaboration session. For example, the user may have attended a collaboration session with a frequency of four times a week. Further, the collaboration frequency field 620 may also note a percentage of whether the user was an attendee or presenter of the collaboration session. In one embodiment, the interface module 510 detects the collaboration sessions.

In one embodiment, the participant history field 630 includes the identities of the participants of collaboration sessions including the user associated with the record 600. In one embodiment, the participant recognition module 570 detects the participants of the collaboration sessions.

In one embodiment, the collaboration history field 640 includes information related the prior collaboration sessions held in which the user associated with the record 600 participated in. In one embodiment, the interface module 510 detects the collaboration sessions.

In one embodiment, the hierarchy field 650 includes information related to the profile's standing relative to other profiles. For example, the profile associated with the record 600 may be related to other profiles similar to a person being categorized within an organization chart within a company. In one instance, the profile associated with the record 600 may manage 40 other people. Accordingly, the hierarchy field 650 would reflect be associated with 40 other profiles in which the current profile would have access to the other profiles.

In one embodiment, the hierarchy field 650 allows the selected profiles to be protected from view or access from other profiles depending on the hierarchy within the field 650. For example, a profile belonging to a rank and file employee would not have access to sensitive information within a profile belonging to a manager in one embodiment.

In one embodiment, the colleague field 660 includes information related friends and colleagues of the user associated with the profile. In one embodiment, the user associated with the record 600 is able to select additional profiles associated with users to be listed within the colleague field 660.

In one embodiment, the application field 670 includes a listing of applications related to the user associated with the profile. In one embodiment, the related applications are owned or licensed by the user. In another embodiment, the related applications are applications desired by the user. In yet another embodiment, the related applications are applications researched by the user.

Figure 7:
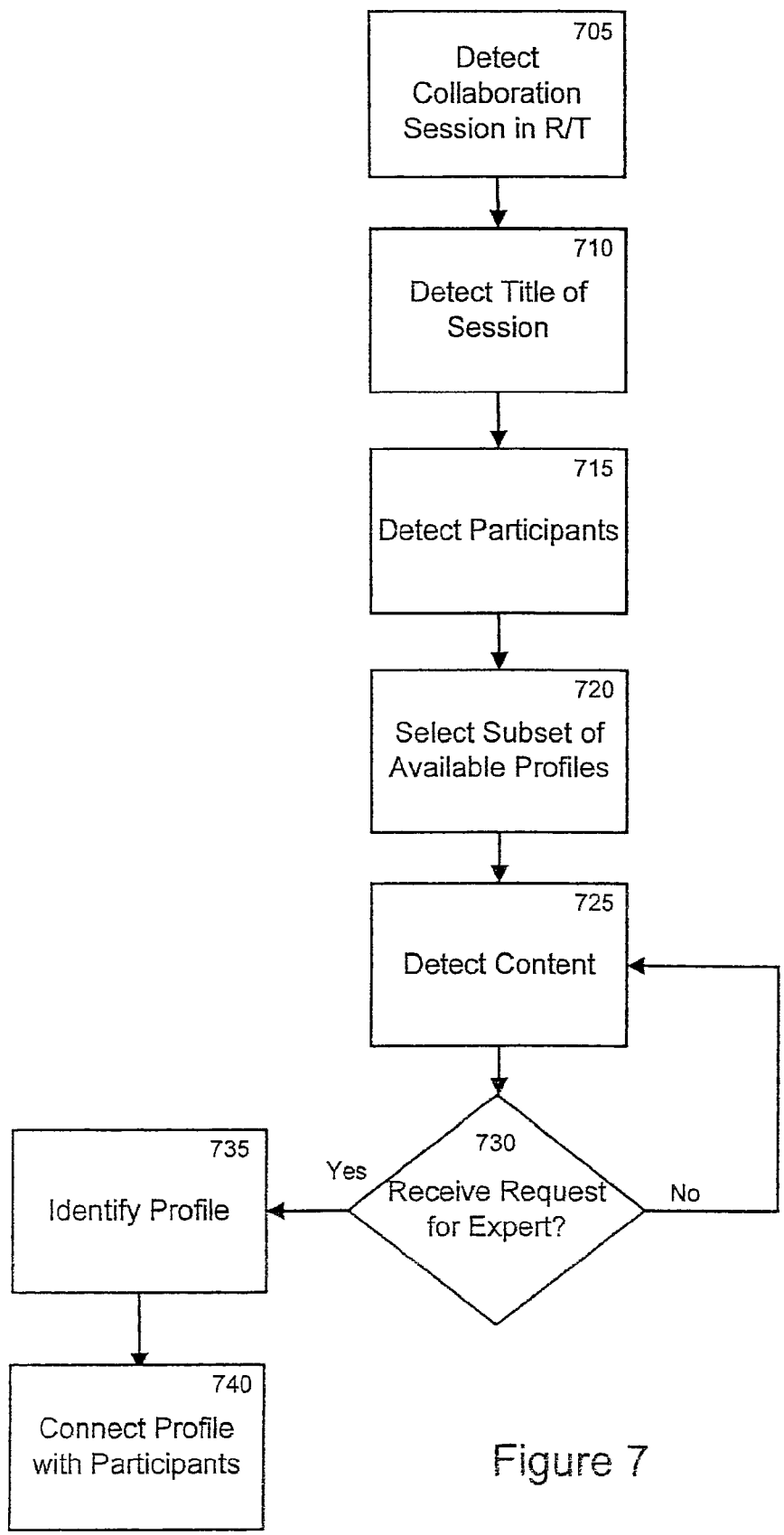
FIG. 7 is a flow diagram consistent with one embodiment of the methods and apparatuses for locating an application during a collaboration session.
Figure 8:
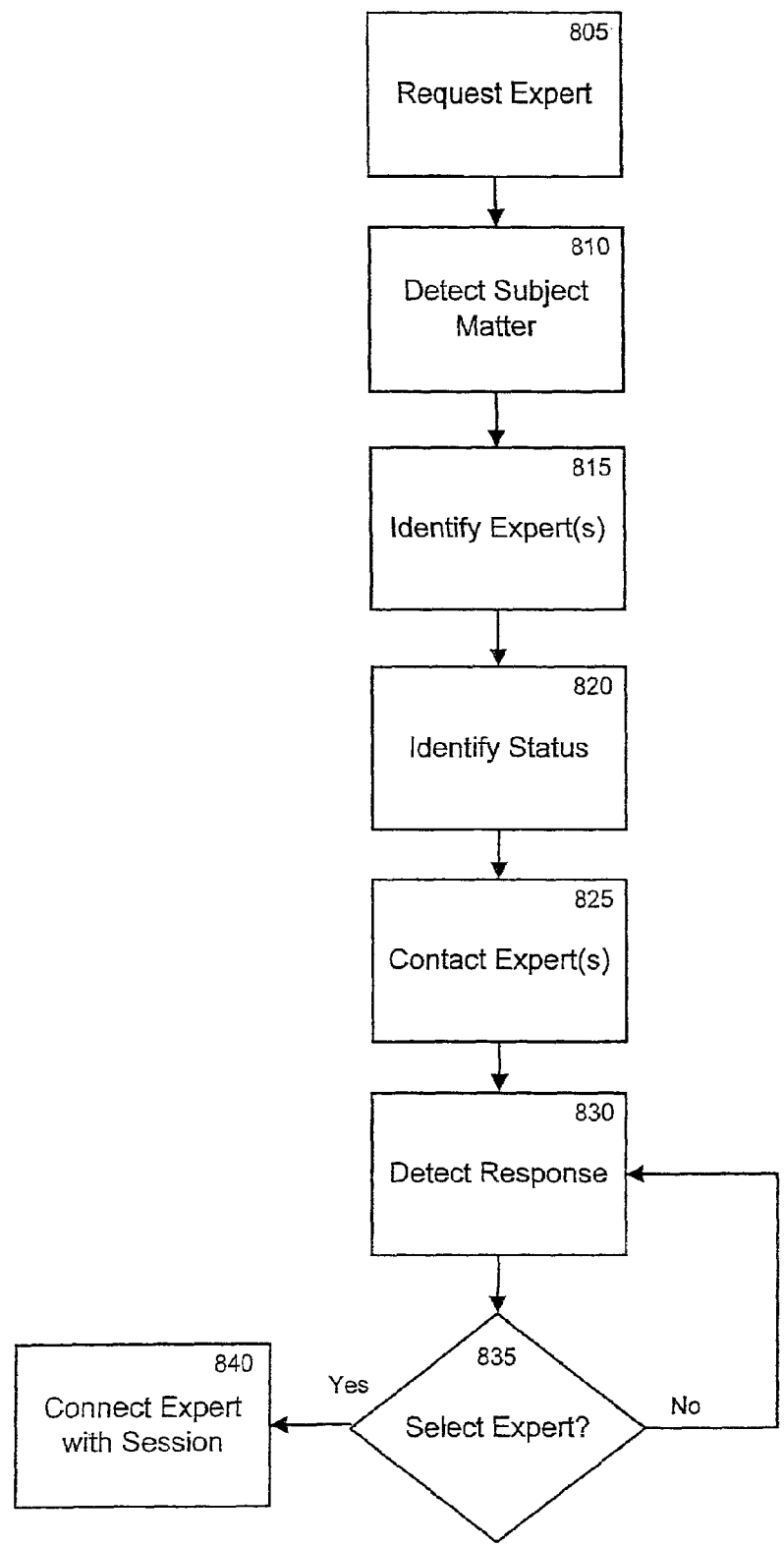
FIG. 8 is a flow diagram consistent with one embodiment of the methods and apparatuses for locating an application during a collaboration session.
Figure 9:
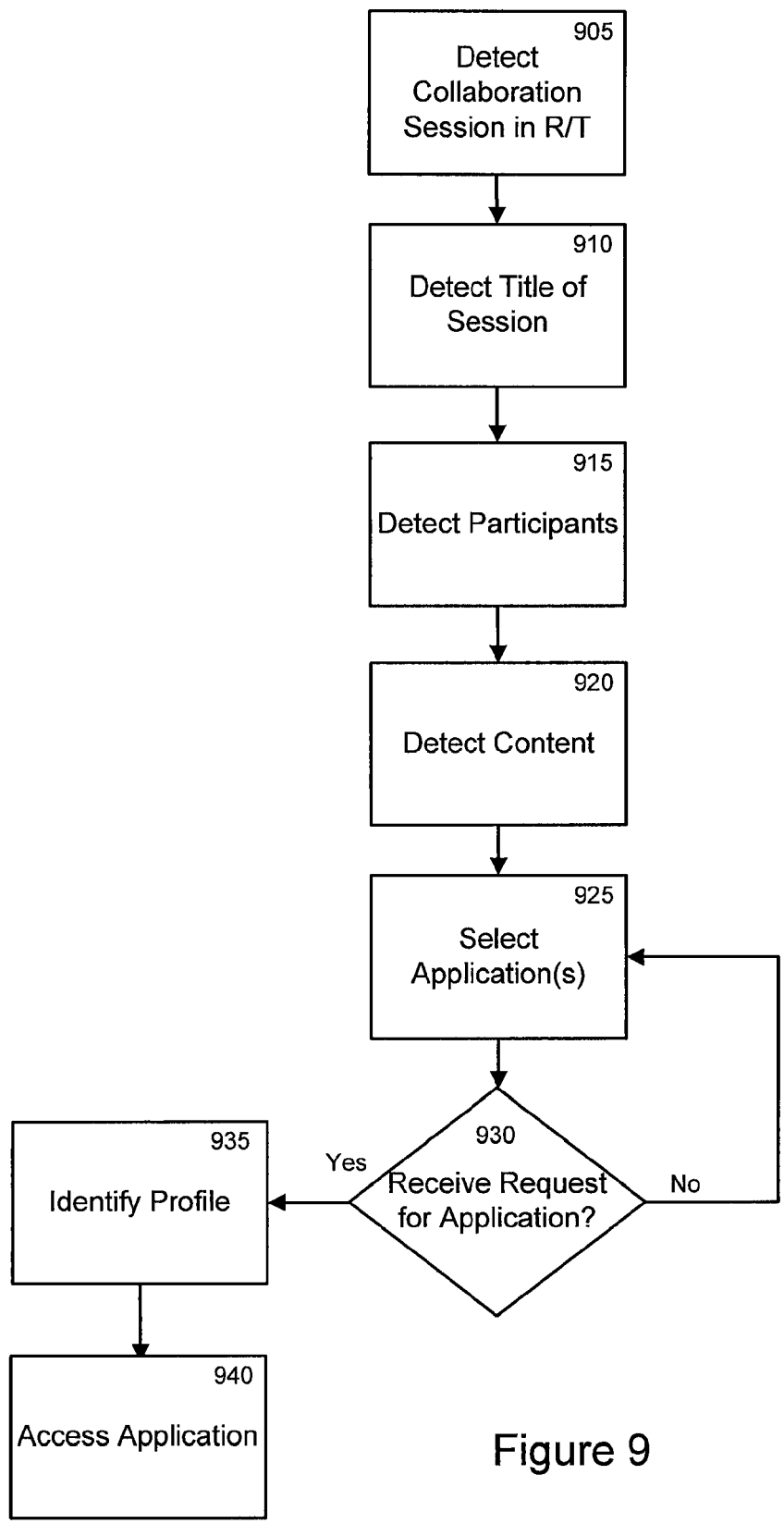
FIG. 9 is a flow diagram consistent with one embodiment of the methods and apparatuses for locating an application during a collaboration session.

The flow diagrams as depicted in FIGS. 7-9 are one embodiment of the methods and apparatuses for locating an application during a collaboration session. The blocks within the flow diagrams can be performed in a different sequence without departing from the spirit of the methods and apparatuses for extending a dynamic social network system. Further, blocks can be deleted, added, or combined without departing from the spirit of the methods and apparatuses for extending a dynamic social network system.

The flow diagram in FIG. 7 illustrates detecting activities during a collaboration session and identifying participants to join the collaboration session according to one embodiment of the invention.

In Block 705, a collaboration session is detected. In one embodiment, the collaboration session corresponds to a collaboration session that is currently taking place. In one embodiment, the collaboration session includes identification of the subject matter of the collaboration session and the participants that are attending the collaboration session.

In Block 710, the title corresponding to the collaboration session is detected.

In Block 715, the participants that are attending the collaboration session are detected. In one embodiment, different participants may attend different portions of the collaboration session. Further, the different participants are detected for the portions of the collaboration that they attend.

In Block 720, a subset of available profiles is determined based on the title of the collaboration session. For example, if the title of the collaboration session is "Caring For Your Teeth", then the subset of available profiles will include users that are related to dental care such as dentist, orthodontists, toothpaste vendors, toothbrush vendors, and the like.

In one embodiment, selected profiles that are accessible and allowed to be searched are considered. In one embodiment, the hierarchy field 650 may be utilized to determine eligibility of the profile for searching.

In Block 725, the content being exchanged during the collaboration session is detected. In one embodiment, the content is the audio content exchanged during the collaboration session. In another embodiment, the content is the video content exchanged during the collaboration session. In yet another embodiment, the content is the textual or graphical content exchanged during the collaboration session.

In Block 730, if there is a request to include an expert to participate in the collaboration session, then in Block 735 a profile is identified from the subset of available profiles that are identified within the Block 720. In one embodiment, the request to include an expert is initiated by one of the participants of the collaboration session.

In one embodiment, the profile is identified based on the content as detected in the Block 725. For example, if the content that is detected in the Block 725 is related to "Deciding on What Type of Material to Use for a Filling", then a profile that is identified as the expert would be a dentist in one embodiment.

In Block 730, if there is no request to include an expert to participate in the collaboration session, then content is detected in Block 725

In Block 740, the user associated with the identified profile in the Block 735 joins the collaboration session.

The flow diagram in FIG. 8 illustrates locating an expert during a collaboration session according to one embodiment of the invention.

In Block 805, an expert is requested during a collaboration session. In one embodiment, the expert is requested by a presenter of the collaboration session. In another embodiment, the expert is requested by an attendee of the collaboration session.

In Block 810, a subject matter of the collaboration is detected. In one embodiment, the subject matter is detected through the content of the collaboration session. In another embodiment, the subject matter is specified by the presenter. In yet another embodiment, the subject matter is specified by the attendee.

In Block 815, at least one expert is identified. In one embodiment, the expert is identified from a corresponding profile that is stored within the storage module 520.

In Block 820, a status of the expert(s) identified within the Block 815 is revealed. In one embodiment, the status includes being available via email, landline telephone, cellular telephone, instant messaging, and the like. In one embodiment, the expert may be available through multiple means.

In Block 825, at least one of the experts is contacted via email, landline telephone, cellular telephone, instant messaging, and the like. For example, the expert is contact through an available means depending on the status of the corresponding expert. Further, the expert is contacted through an appropriate communication based on the available means. For example, if the expert is contacted through email, a textual message is sent to the expert that invites the expert to attend the collaboration session.

In Block 830, a response from one of the experts is detected. In one embodiment, the response confirms the availability of the expert to participate in the collaboration session.

In Block 835, an expert is selected by the requesting party from the Block 805. For example, if the presenter contacted multiple experts for a particular subject matter and at least one expert responded back as being available, a particular expert is chosen by the presenter. If multiple experts responded as being available, the presented is able to select one or more of these experts to participate in the collaboration session.

In Block 840, the selected experts from the Block 835 are invited to join the collaboration session.

The flow diagram in FIG. 9 illustrates detecting activities during a collaboration session and identifying applications to utilize during the collaboration session according to one embodiment of the invention.

In Block 905, a collaboration session is detected. In one embodiment, the collaboration session corresponds to a collaboration session that is currently taking place. In one embodiment, the collaboration session includes identification of the subject matter of the collaboration session and the participants that are attending the collaboration session.

In Block 910, the title corresponding to the collaboration session is detected.

In Block 915, the participants that are attending the collaboration session are detected. In one embodiment, different participants may attend different portions of the collaboration session. Further, the different participants are detected for the portions of the collaboration that they attend.

In Block 920, the content being exchanged during the collaboration session is detected. In one embodiment, the content is the audio content exchanged during the collaboration session. In another embodiment, the content is the video content exchanged during the collaboration session. In yet another embodiment, the content is the textual or graphical content exchanged during the collaboration session.

In Block 925, a list of available applications is determined based on the title of the collaboration session. For example, if the title of the collaboration session is "Caring For Your Teeth", then the list of applications is related to dental care such as dentist, orthodontists, toothpaste vendors, toothbrush vendors, and the like.

In another embodiment, the list of available applications is also determined based on the content of the collaboration session as detected in the Block 920. In yet another embodiment, the list of available applications is also determined based on the participants within the collaboration session as detected in the Block 915.

In one embodiment, selected applications that are accessible and allowed to be searched are considered. In one embodiment, the hierarchy field 650 may be utilized to determine eligibility of the profile for searching.

In Block 930, if there is a request to include an application to utilize during the collaboration session, then in Block 935 the selected application is identified within the Block 925. In one embodiment, the request to utilize an application is initiated by one of the participants of the collaboration session.

In Block 930, if there is no request to utilize an application during the collaboration session, then content is detected in Block 920.

In Block 940, the application identified in the Block 935 is utilized within the collaboration session.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed:

1. A method comprising:
    requesting an application associated with a particular area during a collaboration session for use in the collaboration session, wherein one of a first participant device and a second participant device operates as a presenter device and presents at least one of audio, video, graphical and textual content to the other participant device that operates as an attendee device during the collaboration session;
    reviewing, by a processor, a plurality of user profiles, each user profile associated with a user, to search for one or more users with an expertise in the particular area, the reviewing yielding one or more matching user profiles of users with expertise in the particular area;
    detecting, by the processor, one or more applications, indicated in the one or more matching user profiles of users with expertise in the particular area; and
    ranking application based on the one or more applications indicated in the one or more matching user profiles with expertise in the particular area, the ranked applications presented for inclusion in the collaboration session for use by a user of a participant device during the collaboration session.

2. The method according to claim 1 wherein the particular area is based on content presented during the collaboration session.

3. The method according to claim 1 wherein the particular area is based on detecting a subject matter of the collaboration session.

4. The method according to claim 1 further comprising initiating the collaboration session.

5. The method according to claim 1 further comprising identifying a status of the one or more applications.

6. The method according to claim 5 wherein the status is one of available, unavailable, and undetermined.

7. The method according to claim 1 wherein the one or more applications include a word processor, an email program, a graphics program, an audio program, or a video program.

8. The method according to claim 3 further comprising receiving the subject matter of the collaboration session from one of the attendee device and the presenter device of the collaboration session.

9. The method according to claim 1 wherein the requesting is performed by the presenter device.

10. The method according to claim 1 wherein the requesting is performed by the attendee device.

11. A system, comprising:
    a storage module configured to store a record containing attributes associated with a potential expert in a collaboration session, a first attribute indicating an area of expertise of the potential expert, and a second attribute indicating one or more applications related to the potential expert;
    a content detection module configured to detect a request for an application associated with a particular area for use during the collaboration session;
    a rating manager module configured (i) to review the record to determine that the potential expert has expertise in the particular area, and (ii) to rank a plurality of applications, from the record, for use during the collaboration session based on the one or more applications related to the potential expert.

12. The system according to claim 11 further comprising a participant recognition module configured to detect a user of a participant device during the collaboration session.

13. The system according to claim 11 wherein the content detection module is further configured to determine a subject matter of the collaboration session from content exchanged during the collaboration session, wherein the particular area is based on the subject matter.

14. The system according to claim 11 wherein the rating manager module is further configured to rank one or more records based on how close the area of expertise indicted therein matches the particular area.

15. The system according to claim 11 wherein the one or more applications include a word processor, an email program, a graphics program, an audio program, or a video program.

16. A system comprising:
    a processor;
    means for requesting an application associated with a particular area during a collaboration session for use in the collaboration session, wherein one of a first participant device and a second participant device operates as a presenter device and presents at least one of audio, video, graphical and textual content to the other participant device that operates as an attendee device during the collaboration session;
    means for reviewing a plurality of user profiles, each user profile associated with a user, to search for one or more users with an expertise in the particular area, the reviewing yielding one or more matching user profiles of users with expertise in the particular area;

means for detecting one or more applications indicated in the one or more matching user profiles of users with expertise in the particular area; and means for ranking applications based on the one or more applications indicated in the one or more matching user profiles with expertise in the particular area, the ranked applications presented for inclusion in the collaboration session for use by a user of a participant device during the collaboration session.

17. The system according to claim 16 wherein the means for determining further comprises a means for detecting a subject matter of the collaboration session, wherein the particular area is based on the subject matter.

18. The system according to claim 16 wherein the means for detecting includes a means for storing the one or more applications.

19. The system according to claim 16 wherein the one or more applications include a word processor, an email program, a graphics program, an audio program, or a video program.

* * * * *